Figure 1:
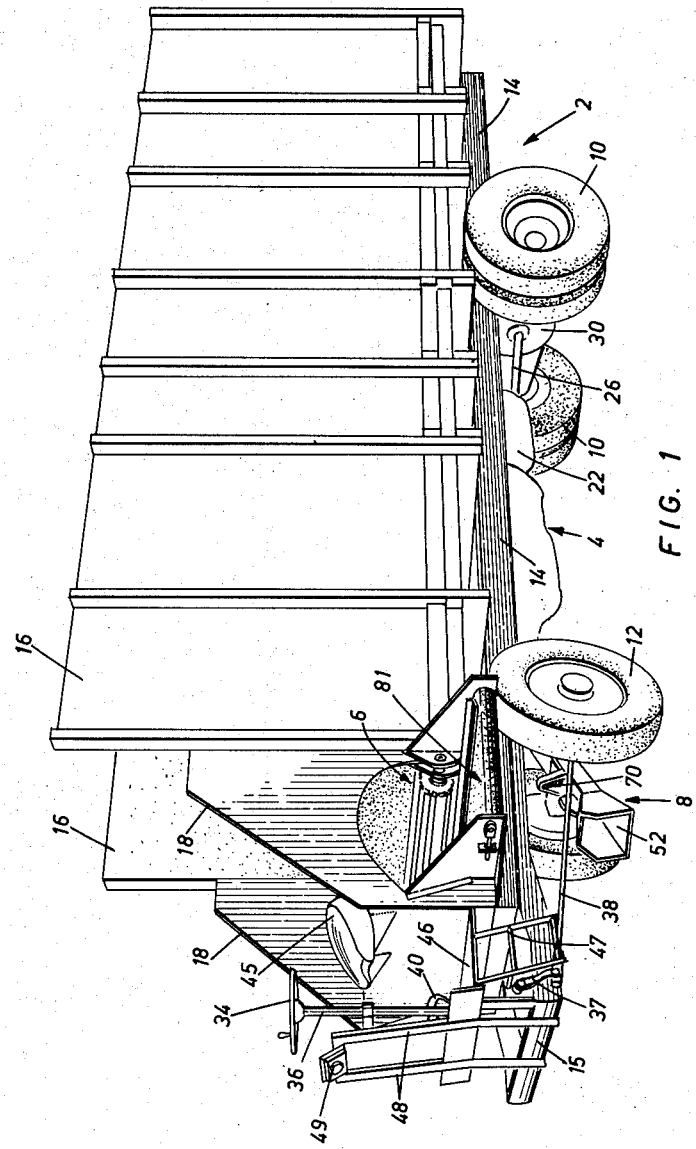

Oct. 8, 1963  W. R. SMALE  3,106,304
SELF-PROPELLED FORAGE HARVESTER WAGON
Filed Nov. 3, 1960  3 Sheets-Sheet 1

Inventor
Wilmer Smale
by:
Patent Agent

Oct. 8, 1963　　　　　W. R. SMALE　　　　　3,106,304
SELF-PROPELLED FORAGE HARVESTER WAGON
Filed Nov. 3, 1960　　　　　　　　　　　3 Sheets-Sheet 2

Inventor
Wilmer Smale
by: Donald P. Smith
PATENT AGENT

Oct. 8, 1963 W. R. SMALE 3,106,304
SELF-PROPELLED FORAGE HARVESTER WAGON
Filed Nov. 3, 1960 3 Sheets-Sheet 3

Inventor
Wilmer Smale
by: Donald F. Sim
PATENT AGENT

United States Patent Office 3,106,304
Patented Oct. 8, 1963

3,106,304
SELF-PROPELLED FORAGE HARVESTER WAGON
Wilmer R. Smale, R.R. 1, Mossley, Ontario, Canada
Filed Nov. 3, 1960, Ser. No. 67,088
1 Claim. (Cl. 214—519)

This invention relates to a self-propelled, self-unloading forage harvester wagon which is particularly useful when detachably coupled by means of a novel hitching arrangement to a forage loading machine.

The function of a forage harvester wagon is to receive the forage, straw or left-over portions of a grain or grass crop in the field from a harvester or forage loading machine, and to transport and unload such forage in a suitable storage location. A forage loading machine may either be incorporated within the harvester unit or towed therebehind as a secondary unit and is adapted to receive and transfer forage to the forage harvester wagon which is customarily towed behind said loading machine.

Hitherto, it has been common practice to employ tractor or horse-drawn wagons which are pulled to the field location, unhitched from the tractor and coupled to the forage loading unit of the harvester which then tows said wagon as it reaps the crop simultaneously transferring the forage into the wagon. When the wagon is loaded, it is unhitched from the loading machine and connected again to the tractor which then pulls the loaded wagon to the storage location for unloading. The inherent disadvantages in this prior practice stem from the loss of time and efficiency resulting from the frequent hitching and unhitching encountered, and the necessity of employing several tractors simultaneously for continuous harvesting. A further disadvantage is the time and labour involved in manually ejecting the forage from the wagon while unloading, although some attempts have been made in prior proposals to overcome this disadvantage by providing automatic mechanical unloading devices housed within the wagon.

One of the greatest disadvantages attendant in the prior proposals results from the time wasted in hitching and unhitching the wagon to the tractor or loading unit because of the relatively awkward hitching arrangements employed. Generally, the operation of these prior hitching arrangements involved a substantial amount of tedious maneuvering and physical labour.

The above and other disadvantages may be substantially overcome by the present invention which provides an economical and rapid method of coupling and uncoupling a wagon to and from a loading unit and transporting the cargo in the wagon off the field through the use of a self-propelled, self-unloading wagon and a novel hitching arrangement associated therewith. Accordingly, in general terms, this invention provides a forage harvester wagon adapted to be detachably coupled to and towed behind a forage loading machine for loading the wagon and subsequently uncoupled and driven away from loading machine to be unloaded, comprising a wagon, power means such as an internal combustion engine operatively connected to the wagon, an unloading apparatus supported on the wagon and a hitching means pivotally mounted on said wagon for detachable connection with said forage loading machine. The wagon preferably comprises a platform supported on wheels and having side and end retaining walls in the usual manner, but with the platform including a projecting front extension adapted to accommodate a driver or driver's chair and controls for operating the power means and unloading apparatus.

The self-unloading apparatus is supported on the wagon platform and is preferably operated by means of said power means and the controls therefor, and may take the form of any of the known suitable unloading apparatus of the prior art.

The hitching means, which may be used to couple any two vehicles together but which is defined herein only in terms of a forage harvester wagon and unloading machine, comprises a main body member pivotally mounted on the forward portion of the wagon and preferably connected to the steering tie-rod of the wagon. A hollow member is rigidly connected to said body member and extends and opens outwardly towards the forward end of the wagon so as to define a passageway having an enlarged opening, adapted to receive and hold in detachable engagement a pulling bar mounted on the rear end of the loading machine. A spring pressure device attached to said body member serves to releasably lock the pulling bar within said hollow member. The hitching means is preferably connected to the steering tie rod of the wagon to facilitate towing.

Figure 2:
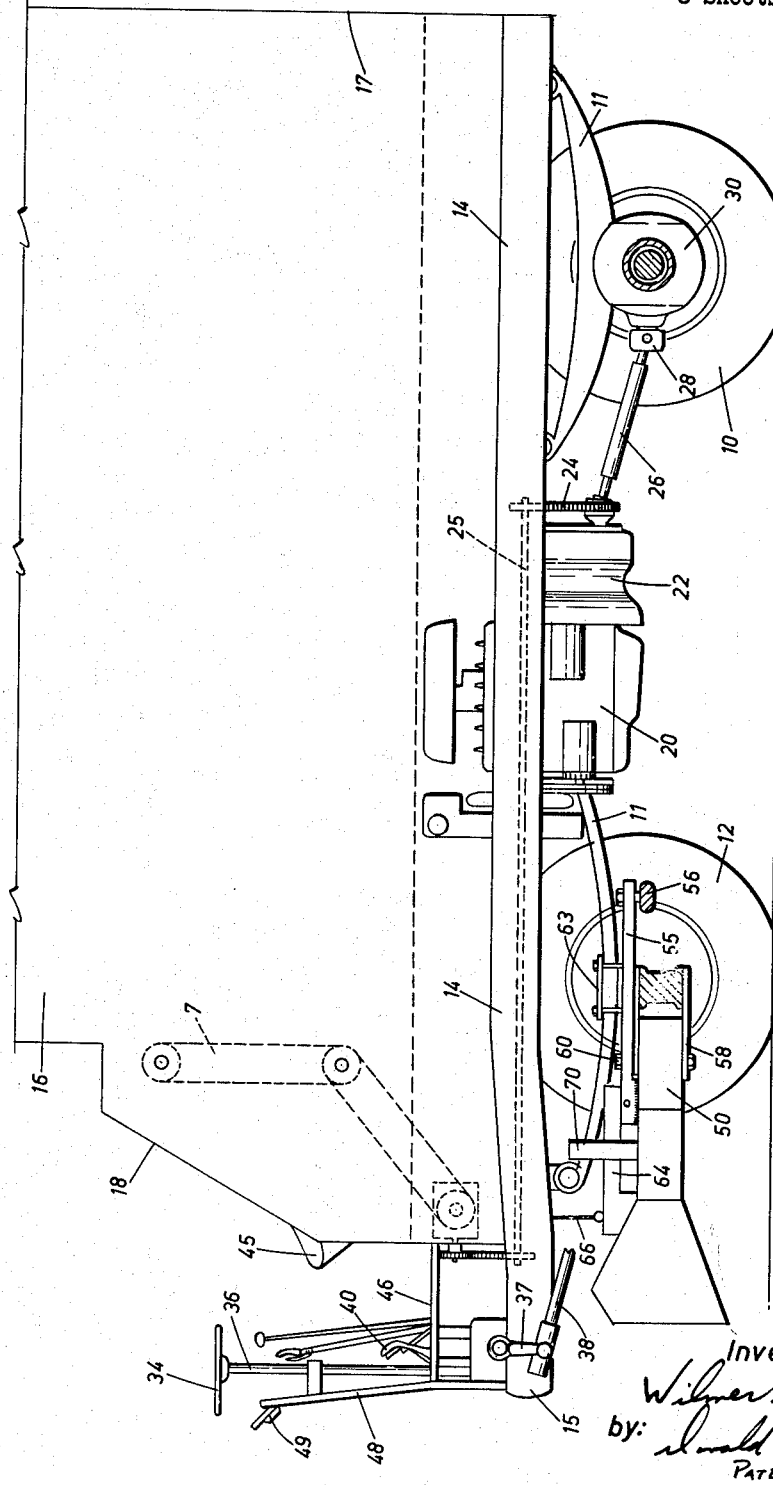
Figure 3:
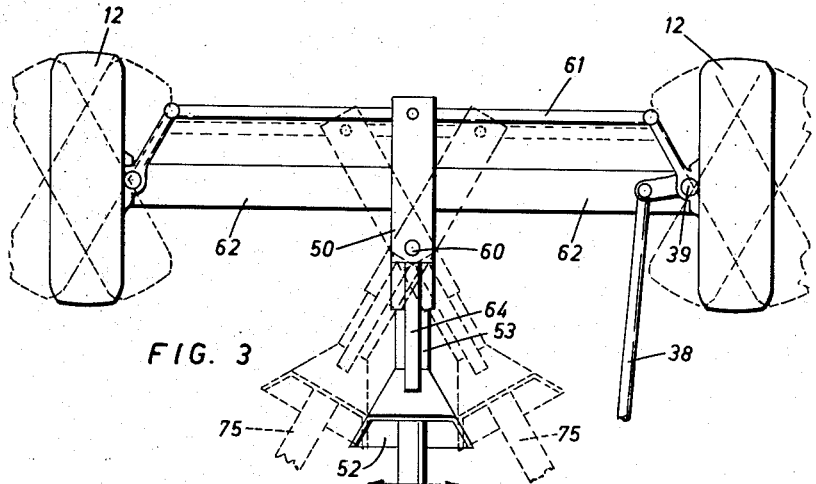
Figure 4:
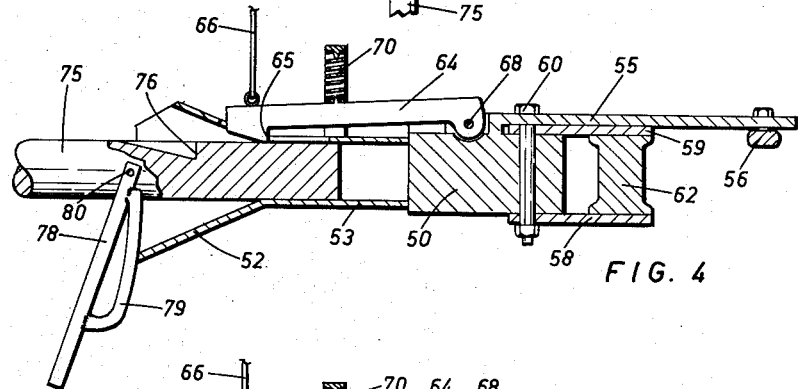
Figure 5:
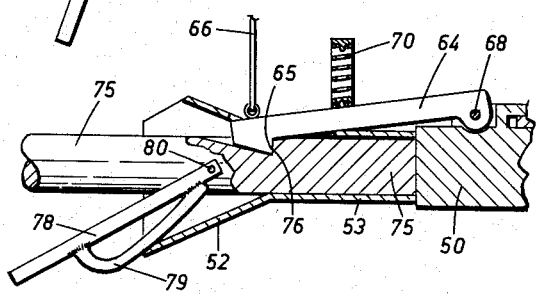

This invention will be more clearly understood and other advantages thereof apparent after reference to the following detailed specification read in conjunction with the attached drawings which illustrate an embodiment of the invention and wherein:

FIGURE 1 is a perspective view of a self-propelled, self-unloading forage harvester, FIGURE 2 is a side elevational view partly in section of the wagon of FIGURE 1, FIGURE 3 is a top plan view showing the hitching means connected to the wagon, FIGURE 4 is a side elevational view partly in section of the hitching means with the pulling bar only partially inserted, and FIGURE 5 is a detailed side sectional view of the hitching means of FIGURE 4 with the pulling bar fully inserted in the locked position.

Referring to the drawings and initially to FIGURE 1 thereof, there is shown a wagon generally indicated at 2 having incorporated thereon a driving or power means 4 and self-unloading apparatus within the walls of the wagon as well as hitching means 8. Wagon 2 is composed of rear wheels 10 which may comprise four wheels as shown for adequate support, front wheels 12 and a platform 14 which is supported by leaf springs 11 in the usual manner. Platform 14 includes a projecting front extension 15 as shown to accommodate the wagon driver and operating controls. Side retaining walls 16 and end wall 17 are arranged vertically about the margin of platform 14. The walls are of a known type, preferably made of wood and may be replaced with walls of different height and strength depending upon the intended cargo of wagon 2. Front extension side walls 18 are arranged on either side of platform extension 15.

Power means 4 is preferably an internal combustion engine 20 of usual type with the associated transmission 22 driving shaft 26 and ultimately wheels 10 through a universal coupling 28 and differential 30. A power takeoff means 24 may be used to transmit power to the unloading apparatus 6 by means of shaft 25. Power means 4 is preferably located intermediate the front and rear wheels with a substantial portion thereof being housed beneath platform 14 as shown, so as to provide the optimum amount of space above platform 14 for the unloading apparatus and the forage cargo.

Platform extension 15 supports operating controls 40 such as brakes, clutch, gear and drive controls commonly used in connection with power means 4 and unloading apparatus 6. Platform portion 14 also contains steering wheel 34 rotatable on steering post 36 to operate the wagon steering mechanism which includes control post 37 adapted to control movement of arm 38 and thus steer front wheels 12 by means of linkage system 39 which turns one wheel and transmits power through tie rod 61 to the other wheel in the known manner. Platform 15 also includes chair 45 which may be adjustable to suit the comfort requirements of the wagon driver. An elevated front platform 46 may also be provided for the driver above platform 15 together with a short ladder 47 facilitating access to platform 46 and chair 45. Supporting arms 48 serve to facilitate mounting of the controls.

The unloading apparatus illustrated comprises a plurality of chains (not shown) running along the bottom of the wagon over the surface of platform 14, with the front chains passing over sprocket 6 which is powered and the rear chains passing over idling rear sprockets located towards the back of platform 14. These chains are arranged and shaped so as to urge the forage material forward. A beater mechanism (not shown) is situated above platform 14 near the forward end thereof, and is powered by chain drive 7 (see FIGURE 2). The beater is adapted to beat the forage as it is brought forward by the lower chains. As the forage is agitated by the beaters it is dropped onto outlet conveyor 81. The unloading apparatus is set into operation by operatively connecting power take-off means 24—25 which starts the chains moving forward and the beaters rotating.

Hitching means 8 (see FIGURES 3, 4 and 5) is composed of a main body member 50 and a hollow member 53 defining a passageway which opens outwardly into an enlarged funnel-shaped opening 52. Body member 50 includes an upper arm 55 extending to and connected with tie-rod 61 by pivot pin 56. Member 50 is pivotally connected to main front axle 62 by means of pivot post 60, and plates 58 and 59 which are welded to axle 62 (see FIGURE 4). The axle 62 is rigidly attached to the frame 14 by means of spring U-bolt 63 connecting axle 62 to front spring 11 (see FIGURE 2). By means of this hitching arrangement, hitching means 8 is pivotally connected to wagon 2 and is also directly connected to steering tie-rod 61 so that when hitching means 8 is turned to the right or left, the wagon will be correspondingly directly steered to the right or left as shown in FIGURE 3. The dotted lines in FIGURE 3 illustrate the hitching means 8 and the wheels 12 turned to the right and to the left and the solid lines show hitching means 8 and wheels 12 in the straight-ahead position.

A locking arm 64 is pivotally mounted on body member 50 by means of pin 68. A spring device 71 is attached to the upper portion of member 53 adjacent and above arm 64 in such a manner that spring 70 acts to normally urge arm 64 downwardly. The upper portion of member 53 is provided with an opening to accommodate arm 64 in the manner hereinafter described. The free end of arm 64 is shaped with a releasable catch projection 65 which is urged by spring 70 downwardly through the top opening member 52. Arm 64 is movable vertically about pivot 68 by means of release rod 66.

Pulling bar 75 is mounted at the rear of the loading machine (not shown) and is shaped so as to fit within passageway 53 of hitching means 8. The upper portion of bar 75 is provided with a notch 76 complementary in shape to catch projection 65. Pulling bar 75 is also preferably provided with a foldable leg or kick-stand 78 having a curved front guard portion 79. Leg 78 is freely swingable about pivot 80 and normally rests vertically upon the ground so as to support pulling bar 75 in a substantially horizontal position. When bar 75 and hitching means are coupled together, enlarged opening 52 will guide bar 75 into passageway 53—54 as shown in FIGURE 4. As bar 75 is inserted into passageway 53, leg 78 will be automatically folded upward adjacent bar 75 upon the contact of guard 79 with the outermost portion of opening 52. Opening 52 should be sufficiently large to accommodate leg 78 and guard 79 in its folded position as shown in FIGURE 5, and pivot point 80 of leg 78 must necessarily be some distance away from end of bar 75.

The following is an outline of the operation of the hitching arrangement in the field, describing the coupling and uncoupling of the forage harvester wagon of this invention to a loading machine. Pulling bar 75 of the stationary loading machine will be initially supported in the horizontal position by supporting leg 78. As the self-propelled wagon approaches behind the loading machine, the driver steers the enlarged opening 52 of hitching means 8 towards the end of bar 75, and as the wagon is further slowly driven towards the loading machine, enlarged opening 52 will guide the end of bar 75 into passageway 53. The lower edge of catch projection 65 is cut back, as shown, so that as bar 75 enters passageway 53, arm 64 and catch 65 will be forced upwardly to allow complete insertion of bar 75 (see FIGURE 4). When the bar 75 is fully inserted, catch 65 will have locked down into notch 76 and will be held there by the downward pressure of spring 70, and leg 78 and guard 79 will be folded upwardly and resting in enlarged opening 52 (see FIGURE 5). The driver of the wagon will stop the forward motion of the wagon when bar 75 has been fully inserted and automatically locked into position. The wagon will then be towed behind the loading machine in the field and filled with forage.

One of the most important advantages of the hitching arrangement of this invention resides in the direct steering relationship whereby the loading machine in effect directly steers the wagon to the left or to the right as required by the path taken by the loading machine or harvester. This feature results from the connection of pulling bar 75 to hitching means 8 which is in turn connected to the wagon steering tie-rod 61. In one method of loading forage, the loading machine is provided with a high spout that transfers forage by means of a blower into the forage wagon over plate 18 and between sides 16. The wagon is generally not occupied when being towed for loading.

To uncouple the wagon from the loading machine, the driver merely raises release rod 66 which disengages catch 65 from notch 76, then the driver backs up the wagon whereupon bar 75 will be withdrawn from passageway 53. As the bar is withdrawn, supporting leg 78 will be free of opening 52 and will swing downwardly to the ground to support pulling bar 75 in the horizontal position ready for the next wagon. The hitching arrangement of the present invention therefore provides a means of quickly coupling and uncoupling one vehicle to and from another vehicle with no physical labour or elaborate positioning of the wagon required, as well as a means of faciliating the steering of the towed wagon. By using the forage harvester wagon and hitching arrangement of the present invention, it will thus be appreciated that a rapid, economical and efficient transfer of forage from the field to storage will be achieved.

It will be understood that although this invention has been illustrated with reference to one embodiment only, it is not to be considered as limited thereto. For example, the present invention could be applied to similar field operations where a self-propelled, self-unloading wagon would be feasible, and the hitching arrangement as mentioned herein could be applied to the coupling of other types of vehicles.

What I claim as my invention is:

Harvesting means comprising a self-propelled self-unloading forage harvester wagon adapted to be detachably coupled to and towed behind a forage loading machine for loading said wagon and then uncoupled and driven away for self-unloading, said forage loading machine having a pulling bar, said wagon comprising a body portion, sets of front and rear rotatable wheels, said sets of front and rear rotatable wheels depending from and supporting said body portion, unloading apparatus in said body portion and adapted to eject forage from said wagon, an internal combustion engine, means connecting said internal combustion engine to drive said rear wheels, means connecting said internal combustion engine to drive said unloading apparatus, means for steering said front wheels including a steering wheel and a tie rod, and hitching means, said hitching means comprising a body member pivotably mounted on said wagon and pivotably connected to said tie rod, whereby said body portion moves in conjunction with said tie rod, said body portion having a passage therein adapted to receive said pulling bar, the passage extending and opening outwardly away from said front and rear wheels, means for detachably locking said pulling bar in the passage comprising an arm pivotally mounted on said body member and having a releasable catch projection at the free end thereof, and spring means biasing said catch into locking engagement with a complementary notched portion on the inserted pulling bar, the forward end of said body member terminating in a funnel-shaped opening adapted to guide said pulling bar into said passage, said pulling bar including a foldable leg normally resting upon the ground to support said pulling bar in a substantially horizontal position, said foldable leg being automatically folded upwardly adjacent said pulling bar to rest within said passage when said pulling bar is coupled to said hitching means.

References Cited in the file of this patent

UNITED STATES PATENTS

| | | |
|---|---|---|
| 1,610,902 | Tomlinson | Dec. 14, 1926 |
| 2,420,009 | Osgood | May 6, 1947 |
| 2,470,842 | Barrington | May 24, 1949 |
| 2,556,748 | Buckley | June 12, 1951 |
| 2,671,673 | Benson | Mar. 9, 1954 |
| 2,771,203 | Collins et al. | Nov. 20, 1956 |
| 2,822,946 | Van Drisse | Feb. 11, 1958 |
| 2,871,029 | Demarest | Jan. 27, 1959 |
| 2,894,756 | McDonough | July 14, 1959 |
| 2,970,710 | Jensen | Feb. 7, 1961 |
| 3,014,729 | Henningsen | Dec. 26, 1961 |
| 3,034,668 | Wicks | May 15, 1962 |